United States Patent [19]

Evers

[11] E Re. 29,390

[45] Reissued Sept. 6, 1977

[54] ELECTRIC DISCHARGE TUBE, COMPRISING A HIGHLY LOADED ANODE

[75] Inventor: Hendrikus Willemina Evers, Eindhoven, Netherlands

[73] Assignee: U.S. Philips Corporation, New York, N.Y.

Related U.S. Patent Documents

Reissue of:

[64] Patent No.: 3,866,076
Issued: Feb. 11, 1975
Appl. No.: 418,583
Filed: Nov. 23, 1973

[30] Foreign Application Priority Data

Dec. 29, 1972 Netherlands ..... 7217782

[51] Int. Cl.[2] ..... H01J 1/46; H01J 21/10

[52] U.S. Cl. ..... 313/293; 313/40; 313/46; 313/296; 313/303

[58] Field of Search ..... 313/40, 46, 295, 296, 313/293, 303, 304, 306, 41

[56] References Cited

U.S. PATENT DOCUMENTS

| | | | |
|---|---|---|---|
| 2,892,113 | 6/1959 | Germer | 313/46 X |
| 3,254,260 | 5/1966 | Vantol | 313/293 |
| 3,428,844 | 2/1969 | Droppa | 313/40 X |
| 3,567,982 | 3/1971 | Droppa | 313/46 |
| 3,586,100 | 6/1971 | Yasuda et al. | 313/40 |
| 3,641,380 | 2/1972 | Stephens | 313/46 |
| 3,641,381 | 2/1972 | Ringeman | 313/46 |

*Primary Examiner*—Saxfield Chatmon, Jr.
*Attorney, Agent, or Firm*—Frank R. Trifari

[57] ABSTRACT

An electronic tube comprises a anode assembled of two inner anode members and an outer anode member. Surface portions of the inner member which are placed against corresponding surface portions of the outer member have a coefficient of thermal radiation of more than 60% of that of the [outer member] *black body* for a temperature of about 500° C.

4 Claims, 2 Drawing Figures

ELECTRIC DISCHARGE TUBE, COMPRISING A HIGHLY LOADED ANODE

Figure 1:
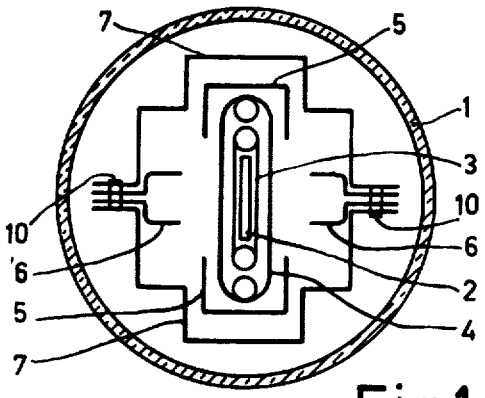

Matter enclosed in heavy brackets [ ] appears in the original patent but forms no part of this reissue specification; matter printed in italics indicates the additions made by reissue.

The invention relates to an electronic tube comprising a highly loaded anode (more than 5 Watt per $cm^2$) which consists of several parts, which parts form two inner anodes and one outer anode, the surfaces of said anode parts being partly placed against each other. The invention relates in particular to the stimulation of the heat transfer between the said parts at a local heating to a temperature of 500° C or more.

It occurs in certain cases that anodes which are composed of several parts and during operation are locally heated to a comparatively high temperature, show a non-uniform distribution in that the heat transfer between the parts is insufficient. This is often the case after the tube has been in operation for some time. Due to expansion of the parts during the heating, deformations may occur as a result of which the heat transfer of surfaces originally placed against each other becomes worse since the surfaces move slightly apart. This may result in local overheating of the anode parts.

A considerable improvement of the heat transfer between parts of the inner anodes and the outer anode, of which parts the surfaces are placed at least partly against each other, is obtained if, according to the invention, the surfaces of the inner anodes placed against surfaces of the outer anode have a coefficient of thermal radiation of more than 60 percent of that of the black body for thermal radiation of 500° C. The parts of the inner anodes are preferably covered at the surface with a sintered nickel layer and the parts of the outer anode consist of iron which is covered with an aluminum layer. However, the inner anode parts may also have a surface which consists of carbonised nickel. The improvement is considerable in particular if the operating temperature of the anode parts is locally 500° C or more.

It has been found that due to the good coefficient of thermal radiation the heat transfer by radiation of surfaces present closely opposite to each other is of the same order of magnitude as that of surfaces engaging each other, at least at temperatures above 500° C. The temperature difference between the surfaces usually proves to be less than 30° C and remains substantially constant during the life, also if the distance between the surfaces varies slightly as a result of deformation of the parts.

The curve of the radiation-quotients, that is to say the quantity of radiated energy per °C, is so steep at 500° C and higher that a temperature difference of 20° is already sufficient to make the heat transfer in the above-mentioned case sufficiently large so that the decrease of the heat transfer as a result of the moving apart of surfaces which originally engage each other is substantially compensated for.

It was known per se to manufacture anodes for electron tubes from a carbonized nickel strip. The places to be welded were made bare. Since the anodes consisted of a single folded part, the heat transfer of the parts of the anode surface engaging each other was of no significance (see U.S. Pat. No. 2,917,811). An inner anode was not present.

The clamping of carbonised nickel fins between the edges of a molybdenum anode in order to connect these edges by welding was known from British Patent Specification No. 518,766. The fins remained cooler than the molybdenum anode so that the last-mentioned anode during degassing could be heated above the melting temperature of nickel. Since the molybdenum anode was bare, there existed apparently a poor heat transfer between said bare anode surfaces and the carbonised nickel fins.

Figure 2:
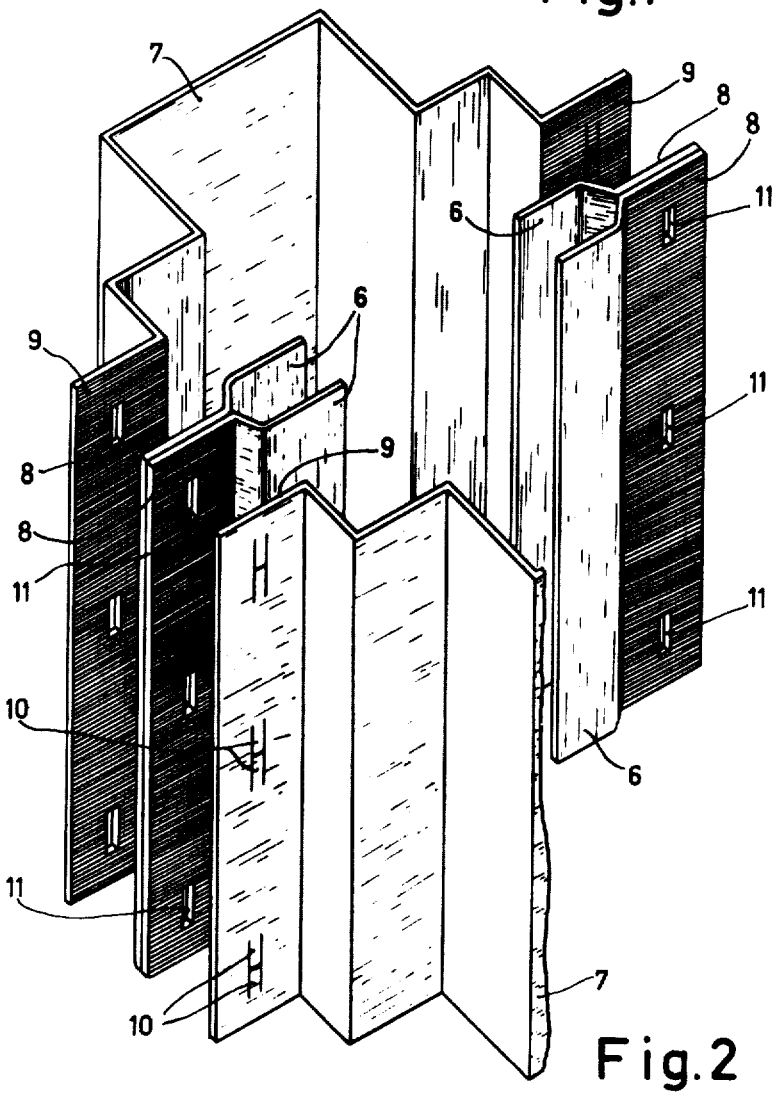

The invention will be described in greater detail with reference to an embodiment and a drawing of which:

FIG. 1 is a cross-sectional view of an electric discharge tube in which the invention is used, while FIG. 2 is a perspective view of the various components of the anode of the tube shown in FIG. 1.

Reference numeral 1 in FIG. 1 denotes an envelope of an electron tube, 2 is a cathode, 3 is a control grid and 4 is a screen grid. Beam electrodes are denoted by 5. The anode consists of two inner anodes 6, 6 and an outer anode 7, 7. The outer anode and each inner anode consists itself of two parts also. The parts 6 of the inner anodes consist at least at the surface of nickel, preferably nickel-plated iron. The parts 7 of the outer anode consist of iron which is covered with an aluminium layer.

Two parts 6 of each inner anode are first connected together, for example, by spot-welding. The parts 6 which are connected to form inner anodes are then covered with nickel oxide, for example, by dipping in a bath of a nickel oxide suspension which may consist, for example, of: 1.5 kg of NiO suspended in 2.1 l of nitrocellulose solution. The suspension is ground in a ball mill and sieved through a sieve having apertures of 0.11 mm (330 meshes per inch). The inner anodes 6,6 are then covered entirely, the surfaces engaging each other excepted, with a grey nickel oxide layer in a thickness of 2 to 4 $\mu$. By firing at 750° C for 30 to 60 minutes in a reducing atmosphere consisting of 75 percent by volume of nitrogen and 25 percent by volume of hydrogen, the NiO is then converted into a readily heat-radiating, grey, sintered nickel layer the coefficient of radiation of which is 65 percent for thermal radiation of 500° C. Such a layer is also favourable in connection with the suppression of secondary emission. The parts 7 of the outer anode are then secured to the inner anodes 6,6. The outer anode consists of iron which is covered with an aluminium layer. By reaction between the iron and the aluminium, the anode surface 7 upon heating is dark coloured so that the coefficient of thermal radiation obtains the desired value. The use of nickel-plated iron for the outer anode is more expensive and hence less desirable.

The surfaces 8 and 9 of the inner and outer anodes, after the assembly of the parts 7 of the outer anode, engage the inner anodes 6,6. The anode parts are connected together, for example, in that lugs 10 of the outer anode parts 7 are forced through holes 11 of the inner anodes.

The surfaces 8 and 9 originally engage each other readily so that a good thermal conductivity from the inner anodes 6,6 to the outer anode 7,7 is obtained. The inner anodes 6,6 become very hot since they receive approximately 40 to 80 percent of the electron current and must dissipate their thermal energy mainly by conduction to the outer anode. The temperature of the inner anode may rise to about 500° C. During the life, the surfaces 8 and 9 are deformed so that they no longer readily engage each other as a result of which the heat transfer from the inner anodes 6,6 to the outer anode 7,7 decreases in an uncontrollable manner. It has been found, however, that, if the surfaces 8 and 9 have a readily heat radiating surface, the heat transfer remains substantially constant throughout the life, at least at an operating temperature of approximately 500° C or higher. At a lower operating temperature the danger of overheating is not present.

The temperature difference between the inner anodes 6,6 and the place of the outer anode 7,7 adjoining the surfaces 9 has been found to be often not more than 20° C. particularly of the anode temperature at that area is more than 500° C. Since the curve of thermal radiation varies with the fourth power of the temperature, said curve at the said temperature is very steep so that, due to radiation of the readily heat radiating surfaces which substantially engage each other, the heat transfer is substantially equal to the original heat transfer by conduction of the surfaces 8 and 9.

What is claimed is:

1. An electronic tube comprising an anode assembled of at least one inner anode member exposed to a higher thermal load and an outer anode member exposed to a lower thermal load, said inner anode member having surface portions placed against corresponding surface portions of said outer anode member and, at a temperature of about 500 degrees centigrade, said surface portions of the inner anode member having a coefficient of thermal radiation which [exceeds the coefficient of the facing surfaces of the outer anode member by] *is* at least 60 percent *of that of a black body.*

[2. An electronic tube as claimed in claim 1, characterized in that the parts of the inner anode member are covered at the surface with a sintered nickel layer and the parts of the outer anode member include iron which is covered with an aluminum layer.]

3. An electronic tube as claimed in claim [2, characterized in that] *5, wherein* the inner anode member includes nickel-plated iron which is covered with the sintered nickel layer.

*4. An electronic tube comprising a central cathode, a composite anode surrounding said cathode and being assembled of an outer anode member formed by two parts each having two connection flanges, a Y-shaped inner anode member having two wings directed against said cathode and a leg inserted between and attached to the opposite connection flanges of said outer anode member, said inner anode member being exposed to a higher thermal load than said outer anode member and, at a temperature of about 500 degrees centigrade, the contact surfaces of said connection flanges having a coefficient of thermal radiation of more than 60% of that of a black body.*

*5. An electronic tube comprising an anode assembled of an outer anode member and at least one inner anode member exposed to a higher thermal load than said outer anode member, said outer anode member being of iron covered with an aluminum layer, said inner anode member being covered with a sintered nickel layer and having surface portions placed against corresponding surface portions of said outer anode member and, at a temperature of about 500 degrees centigrade, said surface portions of the inner anode member having a coefficient of thermal radiation which is at least 60 percent of that of a black body.*

* * * * *

UNITED STATES PATENT AND TRADEMARK OFFICE

CERTIFICATE OF CORRECTION

PATENT NO. : RE 29390

DATED : September 6, 1977

INVENTOR(S) : HENDRIKUS WILLEMINA EVERS

It is certified that error appears in the above-identified patent and that said Letters Patent are hereby corrected as shown below:

In the Title Page, insert

--[21] Appl. No.: 648,309

[22] Filed: Jan. 12, 1976--

Signed and Sealed this

*Twenty-second* Day of *November 1977*

[SEAL]

*Attest:*

RUTH C. MASON
*Attesting Officer*

LUTRELLE F. PARKER
*Acting Commissioner of Patents and Trademarks*